United States Patent
Sharma

(10) Patent No.: US 8,255,686 B1
(45) Date of Patent: Aug. 28, 2012

(54) SECURING SENSED DATA COMMUNICATION OVER A NETWORK

(75) Inventor: Ratnesh K. Sharma, Union City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1297 days.

(21) Appl. No.: 11/829,673

(22) Filed: Jul. 27, 2007

Related U.S. Application Data

(63) Continuation-in-part of application No. 11/002,676, filed on Dec. 3, 2004.

(51) Int. Cl.
*H04L 29/06* (2006.01)
*H04N 7/167* (2011.01)

(52) U.S. Cl. ............ 713/163; 380/200; 713/153

(58) Field of Classification Search ........ 380/270; 713/400, 163
See application file for complete search history.

(56) References Cited

U.S. PATENT DOCUMENTS

| | | | | |
|---|---|---|---|---|
| 5,185,796 A | * | 2/1993 | Wilson | 380/277 |
| 6,263,435 B1 | * | 7/2001 | Dondeti et al. | 713/163 |
| 6,477,149 B1 | * | 11/2002 | Okanoue | 370/312 |
| 6,977,891 B1 | * | 12/2005 | Ranjan et al. | 370/229 |
| 7,391,772 B2 | * | 6/2008 | Hooper et al. | 370/390 |
| 7,649,884 B1 | * | 1/2010 | Ahmed et al. | 370/390 |
| 7,911,980 B1 | * | 3/2011 | Smiljanic | 370/256 |
| 2002/0150097 A1 | * | 10/2002 | Yen et al. | 370/390 |
| 2003/0058095 A1 | * | 3/2003 | Satoh | 340/509 |
| 2003/0185229 A1 | * | 10/2003 | Shachar et al. | 370/460 |
| 2004/0075738 A1 | * | 4/2004 | Burke et al. | 348/143 |
| 2004/0148421 A1 | * | 7/2004 | Achtermann et al. | 709/232 |
| 2006/0013158 A1 | * | 1/2006 | Ahuja et al. | 370/328 |

FOREIGN PATENT DOCUMENTS

WO WO 2005041456 A1 * 5/2005

OTHER PUBLICATIONS

"Developing IP Multicast Networks" vol. 1, Beau Williamson, 2000.*

* cited by examiner

*Primary Examiner* — Taghi Arani
*Assistant Examiner* — Mohammad Rahman

(57) ABSTRACT

A method for securely communicating sensed data over a network that includes receiving sensed data from a sensor, dynamically switching through a plurality of multi-cast group addresses as destinations for sending the received sensed data to a client device based on time measurements, encryption keys, or pseudorandom numbers, and transmitting the sensed data to each of the plurality of multi-cast group addresses through the dynamic switching of the plurality of multi-cast group addresses for receipt by the client device.

19 Claims, 9 Drawing Sheets

SECURING SENSED DATA COMMUNICATION OVER A NETWORK

PRIORITY

This application is a continuation-in-part of pending U.S. patent application Ser. No. 11/002,676 filed on Dec. 3, 2004, and entitled, "SENSED DATA COMMUNICATION OVER A NETWORK," which is herein incorporated by reference in its entirety.

BACKGROUND

A data center may be defined as a location, for example, a room that houses computer systems arranged in a number of racks. A standard rack, for example, an electronics cabinet, is defined as an Electronics Industry Association (EIA) enclosure, 78 in. (2 meters) wide, 24 in. (0.61 meter) wide and 30 in. (0.76 meter) deep. These racks are configured to house a number of computer systems, about forty (40) systems, with future configurations of racks being designed to accommodate 200 or more systems. The computer systems typically dissipate relatively significant amounts of heat during the operation of the respective components. For example, a typical computer system comprising multiple microprocessors may dissipate approximately 250 W of power. Thus, a rack containing forty (40) computer systems of this type may dissipate approximately 10 KW of power.

Sensors are typically positioned throughout the data center to detect temperature, pressure, humidity, or mass flow rates of air. In order to detect these conditions with a relatively high degree of granularity, large numbers of sensors are required to be placed throughout the data center. The sensors are typically configured to transmit detected condition information to a particular computing device. As such, extensive programming and networking is often required for other computing devices to also receive this information. Furthermore, for secure transmission of information, such programming typically includes encryption and decryption of data packets, which can impose significant overhead on the operation of the sensor platforms and severely deteriorate data transmission rates from such sensor platforms. Similarly, typical handshaking protocols used to secure data transmission between senders and receivers also impose large overhead and reduce data transmission rates. Consequently, due in large part to the relatively large numbers of sensors typically employed in data centers, such programming and handshaking are associated with relatively large expenses and substantial degradation in the performance of the sensor platforms when secure data transmission is desired to prevent unauthorized data interception for malicious purposes. In addition, known programming and networking configurations to share information in this manner is also associated with singular points of failure, such that, if one of the computing devices becomes disabled, then all of the other computing devices also fail to receive the detected condition information.

Accordingly, it is desirable to have a relatively efficient and inexpensive method of securely sharing detected condition information among a number of computing devices that does not suffer from the drawbacks associated with known sharing methods as discussed earlier.

BRIEF DESCRIPTION OF THE DRAWINGS

Embodiments are illustrated by way of example and not limited in the following figure(s), in which like numerals indicate like elements, in which.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

As described in greater detail herein, information pertaining to conditions detected by sensors may be securely transmitted to interested devices in relatively simple and efficient manners. More particularly, for example, the information pertaining to the conditions detected by the sensors may be multi-cast to one or more dynamic multi-cast group addresses and ports, such that, devices may access the dynamic multi-cast group addresses and ports to receive the information transmitted by the sensors to which they are interested. According to various embodiments described herein, the multi-cast group addresses and ports may be dynamically changed or switched based upon security policies to provide secure transmission of information from the sensors to the interested devices. Thus, for abbreviation purposes, dynamically-switched multi-cast group addresses (and ports) are referred herein as "dynamic multi-cast group addresses" (and ports).

A sensor platform may receive the information or data pertaining to the conditions detected by the sensors. In addition, the sensor platform may multi-cast this information or data over a network. In this regard, the sensor platform may comprise hardware designed to receive the information from the sensors and to transmit datagram packets containing the received information (or data value) over the network. In addition to the data value, the datagram packet may also include the source name, the purpose of the data value, and a time stamp.

The sensor platforms may be configured during their manufacture to perform the above-described multi-cast functions. Alternatively, the sensor platforms may be programmed after installation to perform these functions. In any respect, new sensor platforms may be added and old sensor platforms may be removed without the need for reconfiguration of the network. In this regard, and as described in greater detail hereinbelow, the system of communicating condition information detected by sensors to various computing devices described herein has no single point of failure and is a modular system. In addition, relational databases are not required to be maintained or reconfigured as sensor platforms are re-deployed as also described in greater detail hereinbelow.

Figure 1:
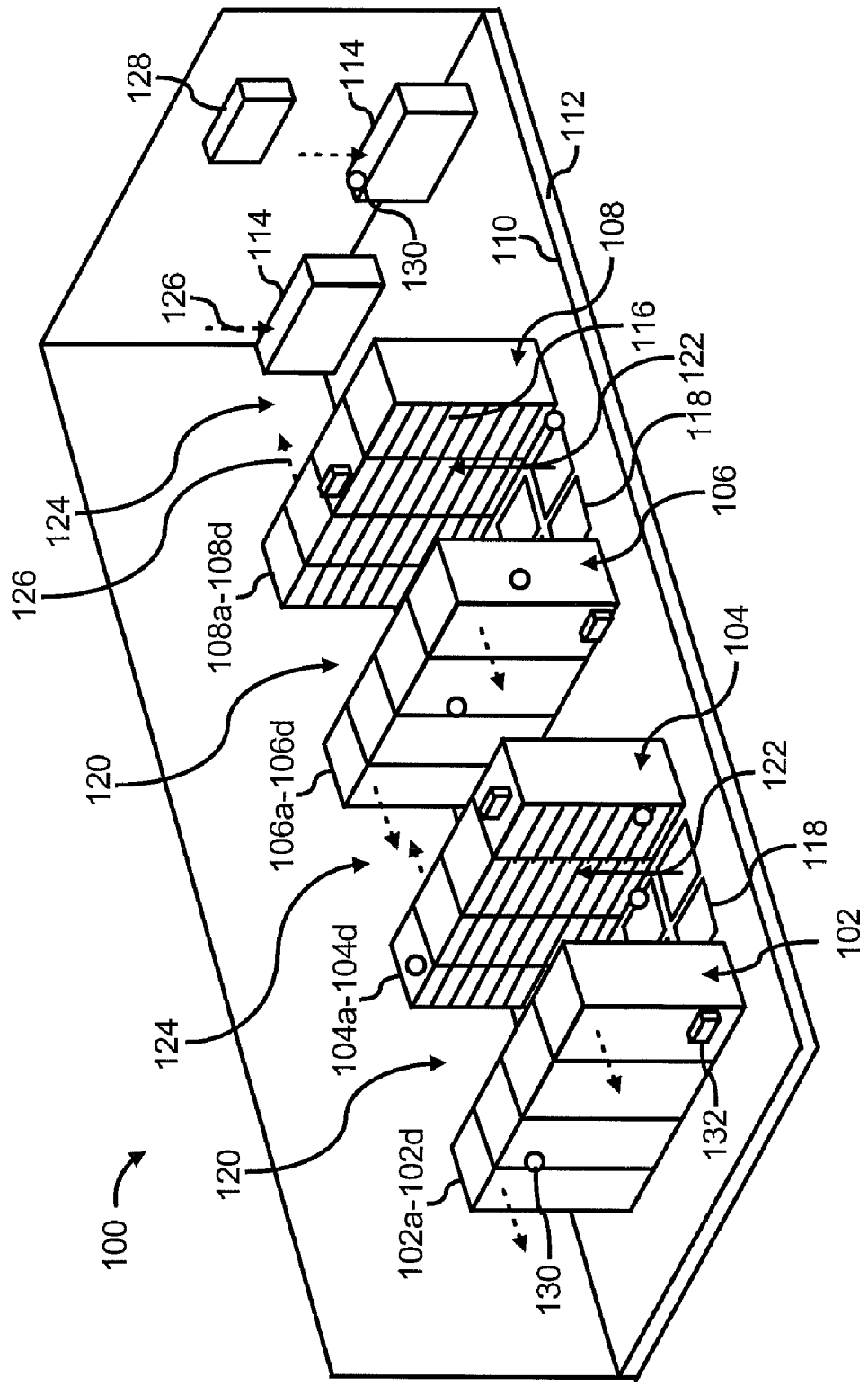
FIG. 1 illustrates a simplified perspective view of a data center, according to an embodiment.

With reference first to FIG. 1, there is shown a simplified perspective view of a data center 100 which may employ various examples of the invention. The terms "data center" are generally meant to denote a room or other space where one or more components capable of generating heat may be situated. In this respect, the terms "data center" are not meant to limit the invention to any specific type of room where data is communicated or processed, nor should it be construed that use of the terms "data center" limits the invention in any respect other than its definition herein above.

It should be readily apparent that the data center 100 depicted in FIG. 1 represents a generalized illustration and that other components may be added or existing components may be removed or modified without departing from the scope of the invention. For example, the data center 100 may include any number of racks and various other components. In addition, it should also be understood that heat generating/dissipating components may be located in the data center 100 without being housed in racks.

The data center 100 is depicted as having a plurality of racks 102-108, for example, electronics cabinets, aligned in parallel rows. Each of the rows of racks 102-108 is shown as containing four racks (a-d) positioned on a raised floor 110. A plurality of wires and communication lines (not shown) may be located in a space 112 beneath the raised floor 110. The space 112 may also function as a plenum for delivery of cooled air from one or more computer room air conditioning (CRAC) units 114 to the racks 102-108. The cooled air may be delivered from the space 112 to the racks 102-108 through vent tiles 118 located between some or all of the racks 102-108. The vent tiles 118 are shown as being located between racks 102 and 104 and 106 and 108.

As previously described, the CRAC units 114 generally operate to supply cooled air into the space 112. The cooled air contained in the space 112 may include cooled air supplied by one or more CRAC units 114. Thus, characteristics of the cooled air, such as, temperature, pressure, flow rate, etc., may substantially be affected by one or more of the CRAC units 114. By way of example, the cooled air supplied by one CRAG unit 114 may mix with cooled air supplied by another CRAC unit 114. In this regard, characteristics of the cooled air at various areas in the space 112 and the cooled air supplied to the racks 102-108 may vary, for example, if the temperatures or the volume flow rates of the cooled air supplied by these CRAC units 114 differ due to mixing of the cooled air. In certain instances, the level of influence of a CRAG unit 114 over the racks 102-108 may be higher for those racks 102-108 that are in closer proximity to the CRAC unit 114. In addition, the level of influence of a CRAC unit 114 over the racks 102-108 may be lower for those racks 102-108 that are located farther away from the CRAC unit 114.

The vent tiles 118 may comprise manually or remotely adjustable vent tiles. In this regard, the vent tiles 118 may be manipulated to vary, for example, the mass flow rates of cooled air supplied to the racks 102-108. In addition, the vent tiles 118 may comprise the dynamically controllable vent tiles disclosed and described in commonly assigned U.S. Pat. No. 6,574,104, the disclosure of which is hereby incorporated by reference in its entirety. As described in the U.S. Pat. No. 6,574,104, the vent tiles 118 are termed "dynamically controllable" because they generally operate to control at least one of velocity, volume flow rate and direction of the cooled airflow therethrough. In addition, specific examples of dynamically controllable vent tiles 118 may be found in co-pending U.S. Pat. No. 6,694,759, filed on Jan. 27, 2003, which is assigned to the assignee of the present invention and is incorporated by reference herein in its entirety.

The racks 102-108 are generally configured to house a plurality of components 116 capable of generating/dissipating heat (not shown), for example, processors, micro-controllers, high-speed video cards, memories, semi-conductor devices, and the like. The components 116 may be elements of a plurality of subsystems (not shown), for example, computers, servers, bladed servers, etc. The subsystems and the components may be operated to perform various electronic functions, for example, computing, switching, routing, displaying, and the like. In the performance of these electronic functions, the components, and therefore the subsystems, may generally dissipate relatively large amounts of heat. Because the racks 102-108 have generally been known to include upwards of forty (40) or more subsystems, they may transfer substantially large amounts of heat to the cooled air flowing therethrough to maintain the subsystems and the components generally within predetermined operating temperature ranges.

The areas between the racks 102 and 104 and between the racks 106 and 108 may comprise cool aisles 120. These aisles are considered "cool aisles" because they are configured to receive cooled airflow from the vent tiles 118, as generally indicated by the arrows 122. In addition, the racks 102-108 generally receive cooled air from the cool aisles 120. The aisles between the racks 104 and 106, and on the rear sides of racks 102 and 108, are considered hot aisles 124. These aisles are considered "hot aisles" because they are positioned to receive air that has been heated by the components 116 in the racks 102-108, as indicated by the arrows 126. By substantially separating the cool aisles 120 and the hot aisles 124, for example, with the racks 102-108, the heated air may substantially be prevented from re-circulating with the cooled air prior to delivery into the racks 102-108. In addition, the cooled air may also substantially be prevented from re-circulating with the heated air prior to returning to the CRAC units 114. However, there may be areas in the data center 100 where re-circulation of the cooled air and the heated air occurs. By way of example, cooled air may mix with heated air around the sides or over the tops of one or more of the racks 102-108.

The sides of the racks 102-108 that face the cool aisles 120 may be considered as the fronts of the racks and the sides of the racks 102-108 that face away from the cool aisles 120 may be considered as the rears of the racks 102-108. For purposes of simplicity and not of limitation, this nomenclature will be relied upon throughout the present disclosure to describe the various sides of the racks 102-108.

According to another example, the racks 102-108 may be positioned with their rear sides adjacent to one another (not shown). In this embodiment, the vent tiles 118 may be provided in each aisle 120 and 124. In addition, the racks 102-108 may comprise outlets on top panels thereof to enable heated air to flow out of the racks 102-108.

The CRAC units 114 generally operate to cool received heated air as indicated by the arrows 126. In addition, the CRAG units 114 may supply the racks 102-108 with airflow that has been cooled, through any reasonably suitable known manners and may thus comprise widely available, conventional CRAC units 114. For example, the CRAC units 114 may comprise vapor-compression type air conditioning units, chiller type air conditioning units, etc. Examples of suitable CRAC units 114 may be found in co-pending and commonly assigned U.S. patent application Ser. No. 10/853,529, filed on May 26, 2004, and entitled "Energy Efficient CRAC Unit Operation," the disclosure of which is hereby incorporated by reference in its entirety.

Also shown in FIG. 1 is a computing device 128 configured to control various operations of the data center 100. The computing device 128 may be configured, for example, to control the vent tiles 118 to thereby vary at least one of a direction and a volume flow rate of cooled airflow delivered through the vent tiles 118. In one regard, the computing device 128 may control the vent tiles 118 to move from fully closed positions to fully open positions. In determining manners in which the vent tiles 118 may be manipulated, the computing device 128 may receive temperature information from a plurality of sensors 130 positioned at various locations throughout the data center 100, as will be described in greater detail hereinbelow.

The sensors 130 may also be configured to detect various other conditions in the data center 100. For example, the sensors 130 may be configured to detect humidity, airflow direction, airflow magnitude, pressure, positions of movable objects, etc. Some or all of the sensors 130 may be in communication with respective sensor platforms 132 configured to communicate the detected condition information over a network. As will be described in greater detail hereinbelow, the sensor platforms 132 are generally configured to obtain detected condition information from the sensors 130 and to transmit the information over the network to particular dynamic multi-cast group addresses such that interested hardware and/or software may "listen in" to the particular multi-cast group addresses to obtain the information transmitted by the sensor platforms 132.

The locations of the sensors 130 and the sensor platforms 132 in FIG. 1 are for representative purposes only and are not intended to limit the data center 100 in any respect. Therefore, the sensors 130 and the sensor platforms 132 may be positioned at any reasonably suitable locations in the data center 100. The data center 100 is also illustrated in FIG. 1 as containing four rows of racks 102-108 and two CRAC units 114 for purposes of simplicity of illustration. Thus, the data center 100 should not be limited in any respect based upon the number of racks 102-108 and CRAC units 114 illustrated in FIG. 1. In addition, although the racks 102-108 have all been illustrated similarly, the racks 102-108 may comprise heterogeneous configurations. For example, the racks 102-108 may be manufactured by different companies or the racks 102-108 may be designed to house differing types of components 116, for example, horizontally mounted servers, bladed servers, etc.

Figure 2A:
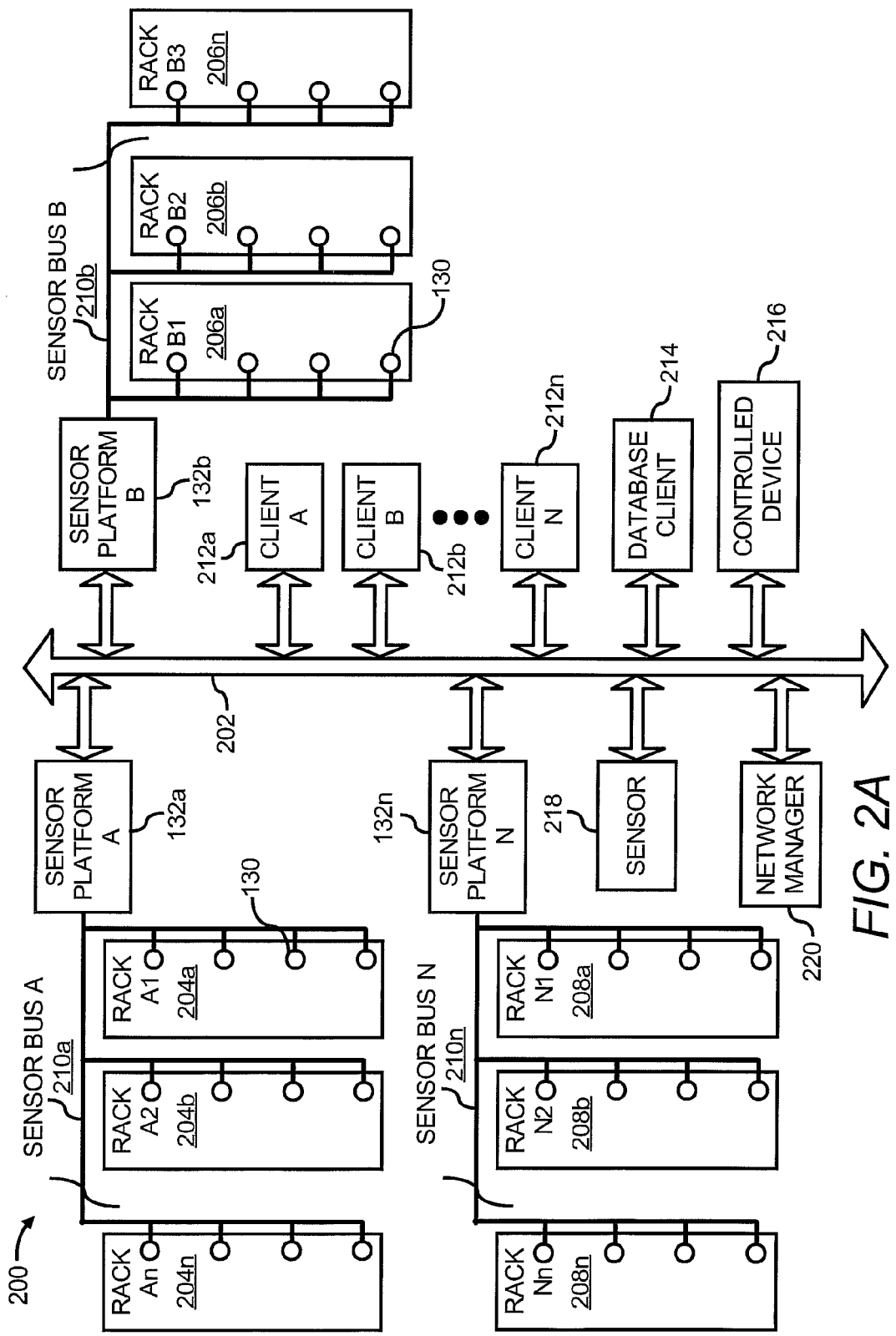
FIG. 2A illustrates a diagram of a network in the data center depicted in FIG. 1, according to an embodiment.

FIG. 2A is a diagram 200 of a network in the data center 100, according to an example of the data center 100. It should be understood that the following description of the diagram 200 is but one manner of a variety of different manners in which such a diagram 200 may be configured. In addition, it should be understood that the diagram 200 may include additional components and that some of the components described may be removed and/or modified without departing from a scope of the diagram 200. In the following description of FIG. 2A, the designations "n" and "N" generally denote any reasonably suitable number.

The diagram 200 depicts a network 202 configured to enable communications between various devices connected to the network 202. The network 202 may comprise an existing network in the data center 100. In addition, part or the entire network 202 may comprise separately installed or configured networks added to an existing network in the data center 100. Moreover, the network 202 may comprise a wired network or it may represent a wireless data communication system. Thus, although a physical network 202 is illustrated in FIG. 2A, it should be understood that the network 202 may depict a wireless network. In any regard, a number of devices may be configured to communicate to each other over the network 202 as will be described in greater detail hereinbelow. In addition, the data may be encrypted through use of symmetric or asymmetric keys to thereby increase security in transmitting the data.

As shown, sensors 130 are positioned at various locations of the data center 100. Only two of the sensors 130 are labeled for simplicity purposes. It should, however, be understood that similarly illustrated elements also comprise sensors 130. The sensors 130 may comprise any number of different types of sensing devices configured to detect one or more conditions. By way of example, the sensors 130 may comprise devices for detecting at least one environmental condition, for example, temperature detectors (for example, thermistors, thermometers, thermocouples, etc.), anemometers, humidity detectors, pressure detectors, etc., or combinations thereof.

As another example, the sensors 130 may comprise devices for detecting relative positions of various apparatuses, for example, door position detectors, encoders, etc. As a further example, the sensors 130 may comprise devices configured to detect the power drawn by one or more components in the data center 100. In addition, the types of sensors 130 deployed in the data center 100 may also differ from one another, such that, a temperature detector may be positioned on the same sensor bus as an encoder. It should also be understood that the sensors 130 listed hereinabove are not meant to limit the diagram 200 in any respect, but are provided as examples of suitable sensors. Therefore, other sensors not specifically listed may also be included in the diagram 200 as communicating over the network 202. In addition, these other sensors may include sensors that are not heretofore known.

The sensors 130 are illustrated as being housed in or around respective racks A1-An, B1-Bn, and N1-Nn (204a-204n, 206a-206n, and 208a-208n, hereinafter (204a . . . 208n)). Thus, for example, the sensors 130 may be positioned and configured to detect one or more conditions at variously located racks 204a . . . 208n as well as within or around the variously located racks 204a . . . 208n. As another example, one or more of the sensors 130 may be positioned to detect conditions around vent tiles 118, return vent tiles (not shown), CRAC units 114, etc.

The racks 204a-204n labeled as A1 . . . An may comprise racks situated in a particular row of racks. In addition, or alternatively, the racks 204a-204n may comprise racks that are situated in different rows or in various clusters. Thus, for example, the racks 204a-204n may be situated in a particular zone in the data center 100 and may thus not be contained in a particular row of racks in the data center 100. The remaining racks 206a . . . 208n may also be situated in this manner.

The sensors 130 may be positioned based upon the one or more conditions the sensors 130 are configured to detect. For example, if a sensor 130 is configured to detect the temperature of the airflow at an inlet of a rack 204a, the sensor 130 may be positioned near a lower section of the rack 204a and substantially close to a vent tile 118. As another example, if the sensor 130 is configured to detect the position of a door of the rack 204a, the sensor 130 may be appropriately placed to detect the door position.

The sensors 130 are depicted as communicating with respective sensor platforms A-N 132a-132n over respective sensor buses A-N 210a-210n. The sensor buses 210a-210n may comprise existing wires or devices configured to enable one or both of data transmission and power supply to components such as servers 116 housed in the racks 204a . . . 208n. Alternatively, the sensor buses 210a-210n may comprise other wires or devices configured to enable communications between the sensors 130 and their respective sensor platforms 132a-132n. For example, the sensor buses 210a-210n may comprise wires or other devices that have been installed for the purpose of enabling data transfer between the sensors 130 and their respective sensor platforms 132a-132n. In addition, the sensor buses 210a-210n may comprise wires that are configured to supply power to the sensors 130.

The sensor platforms 132a-132n are illustrated as being connected to or otherwise configured to transmit and receive data over the network 202. The sensor platforms 132a-132n generally operate to facilitate and direct data collected by the sensors 130 over the network 202. In one respect, the sensor platforms 132a-132n may transmit the data received from the sensors 130 to dynamic multi-cast group addresses over the network 202, and the interested clients or devices are synchronized with the sensor platforms 132a-132n to receive this data by "listening in" to the dynamic multi-cast group addresses. For example, the sensor platforms 132a-n may dynamically switch through a plurality of multi-cast group addresses within an allocated band to transmit the data received from the sensors 130 to interested clients or devices based on time synchronization with such interested clients or devices to ensure synchronized switching of the multi-cast group addresses. In another example, the sensor platforms 132a-132n may dynamically switch through a plurality of multi-cast group addresses within an allocated band to transmit the data received from the sensors 130 to interested devices based on encryption keys that are also provided to such interested devices for synchronization of the switching of the multi-cast group addresses. In yet another example, the sensor platforms 132a-132n may dynamically switch through a plurality of multi-cast group addresses within an allocated band to transmit the data received from the sensors 130 to interested devices based on pseudo-random numbers that are also provided to such interested devices for synchronization of the switching of the multi-cast group addresses. Various manners in which the sensor platforms 132a-132n dynamically switch through a plurality of multi-cast group addresses are described in greater detail herein below.

Accordingly, interested devices may receive the data transmitted by the sensor platforms 132 from the network 202 based upon time synchronization, encryption keys, and pseudo-random numbers. For example, the interested devices may determine which of the data transmitted by which of the sensor platforms 132a-132n they are interested in based upon the dynamic multi-cast group address to which the data was transmitted by the sensor platforms 132a-132n at a particular point in time due to time synchronization, encryption keys, and pseudo-random numbers.

The interested devices may comprise client devices 212a-212n, a database client 214, and in certain instances, a controlled device 216. The client devices 212a-212n may comprise devices configured to control various components, for example, the controlled device 216, in the data center 100. By way of example, at least one of the client devices 212a-212n may be configured to control cooled air delivery to one or more locations in the data center 100. According to this example, at least one of the client devices 212a-212n may receive data related to environmental conditions in a particular area and the at least one client device 212a-212n may be configured to operate one or more vent tiles 118 or one or more CRAC units 114 to vary a characteristic of the cooled airflow delivered to the particular area. More particularly, for example, the mass flow rate of air delivered into a rack 204a may be detected by a mass flow sensor 130 and a client device 212a may determine that the mass flow rate of air supplied to that rack 204a is insufficient. In this case, the client device 212a may control an actuator (not shown) in the vent tile 118 to increase the mass flow rate of air supplied to that rack 204a.

The database client 214 may comprise a database where data transmitted by the sensor platforms 132a-132n may be stored. In similar fashion to the client devices 212a-212n, the database client 214 may receive various data based upon the dynamic multi-cast group address to which the sensor platforms 132a-132n transmit the data. Thus, the database client 214 may be selective in what types of data is stored in a memory of the database client 214. In addition, the database client 214 may perform various tasks with the data received from the sensor platforms 132a-132n depending upon the addresses to which the sensor platforms 132a-132n transmit the data. For example, the database client 214 may separate data into different folders or directories depending upon the addresses to which the data is transmitted. In this example, the database client 214 may aggregate particular types of data.

The controlled device 216 may comprise a device configured to be controlled by one or more client devices 212a-212n, with instructions from the one or more client devices 212a-212n being delivered over the network 202. Alternatively, the controlled device 216 may be controlled directly by one or more of the client devices 212a-212n. As a further example, the controlled device 216 may include the functionality of the client devices 212a-212n. In this example, the controlled device 216 may receive data to which it is interested and may act upon that data by, for example, operating an actuator.

Although the sensor platforms 132a-132n have been disclosed as transmitting data obtained from the sensors 130, in certain instances, the sensors 130 may also perform the functions of the sensor platforms 132a-132n. For example, the sensor 218 may be configured to transmit detected condition data, as well as other data, over the network 202 without requiring the data first go through a sensor platform 132a-132n. The sensor 218, in this instance, may contain some or all of the components contained in a sensor platform 132a-132n. In this regard, the sensor 218 may be programmed with a dynamic multi-cast group address to which to transmit the detected data.

Also shown in FIG. 2A is an optional network manager 220. The network manager 220 may be provided to, for example, manage the dynamic selection of multi-cast group addresses based on time synchronization, encryption keys, and pseudo random numbers.

A more detailed description of the configurations of the various components depicted in FIG. 2A, as well as various operations performed by the components, is provided herein below with respect to FIG. 2B.

Figure 2B:
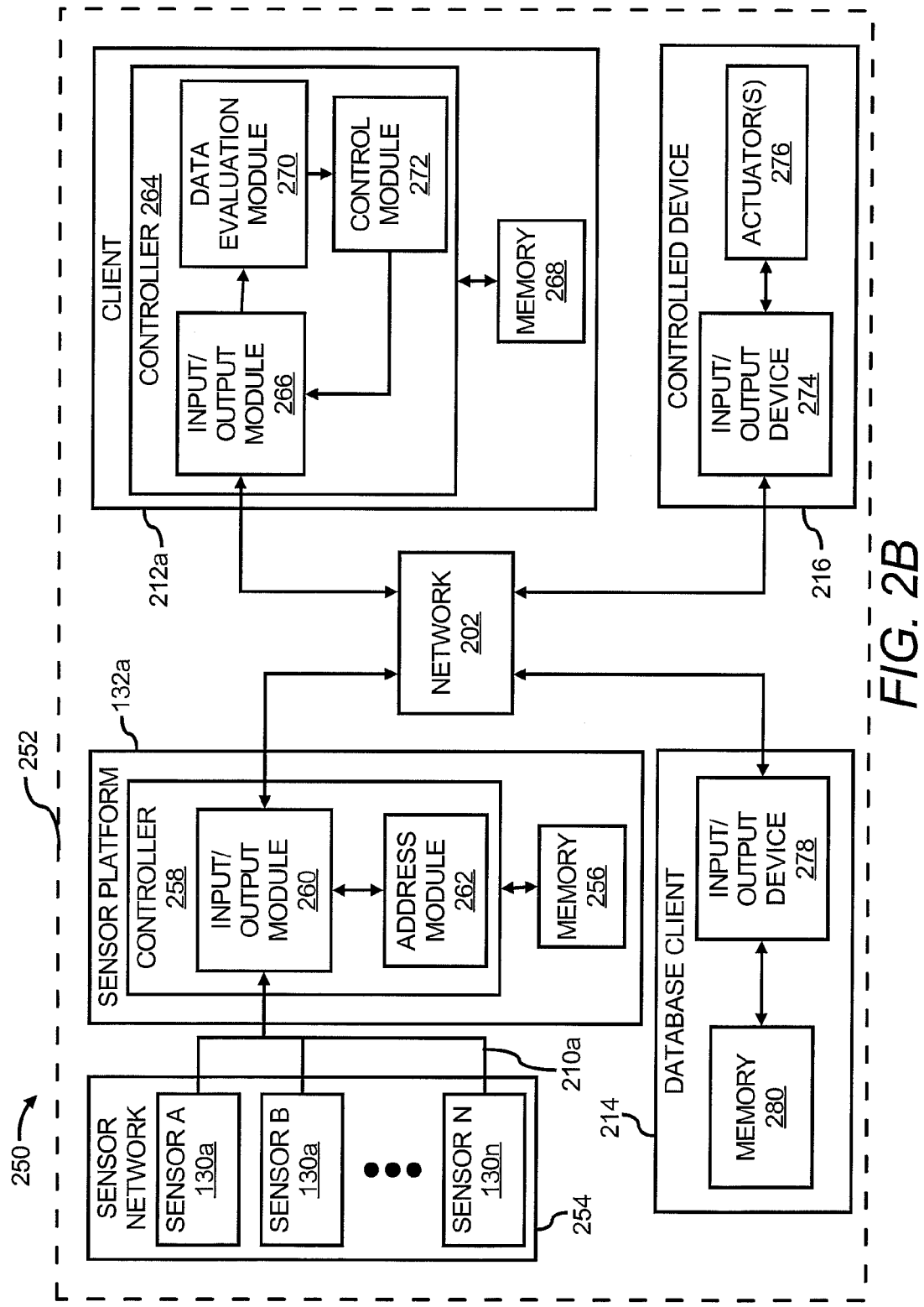
FIG. 2B is a block diagram of a networked system, similar to the network diagram illustrated in FIG. 2A, according to an embodiment.

FIG. 2B illustrates a block diagram 250 of a networked system 252, depicting the components in FIG. 2A in greater detail. It should be understood that the following description of the block diagram 250 is but one manner of a variety of different manners in which such a system 252 may be configured. In addition, it should be understood that the block diagram 250 may include additional components and that some of the components described may be removed and/or modified without departing from a scope of the block diagram 250. In the following description of FIG. 2B, the designations "n" and "N" generally denote any reasonably suitable number.

The description of FIG. 2B is made with reference to particular components contained in FIG. 2A, while reference to certain other elements are omitted. It should, however, be understood that the description set forth with regard to the components depicted in FIG. 2B may relate to similarly labeled components in FIG. 2A. Thus, for example, a description of the sensor platform 132a in FIG. 2B is applicable to the other sensor platforms 132b-132n depicted in FIG. 2A.

As shown in FIG. 2B, the sensors 130a-130n may be considered as forming part of a sensor network 254. The sensor network 254 may comprise any reasonably suitable number of sensors 130a-130n located at various locations in the data center 100. By way of example, the sensors 130a-130n may be positioned to detect one or more conditions in and/or around a rack, for example, rack 204a, or a particular set of racks in a row of racks, for example, racks 204a-204n. As another example, the sensors 130a-130n may be positioned to detect one or more conditions in and/or around a particular set of racks in different rows of racks. As a further example, the sensors 130a-130n may be positioned to detect one or more conditions around a combination of racks and vent tiles 118, around vent tiles 118, around CRAC units 114, etc. As may be evidenced from the examples above, the sensor network 254 depicted in FIG. 2B may represent any number of different sensor combinations as well as variously located sensors.

In any regard, the sensors 130a-130n are configured to transmit data to a sensor platform 132a over, for example, a sensor bus 210a, as stated herein above with respect to FIG. 2A. More particularly, the sensors 130a-130n may transmit information pertaining to identification of the sensor, data value (for example, the detected condition data), time stamp (for example, the time at which the data was collected or when the data was transmitted), etc. The sensors 130a-130n may be identified in a number of different manners. In one example, the sensors 130a-130n may be provided with names that substantially uniquely identify the sensors 130a-130n. In this example, the sensor platform 132a may be programmed with information correlating the sensor 130a-130n names to their locations. This information may, for example, be stored in a memory 256 of the sensor platform 132a.

Alternatively, the sensors 130a-130n may be identified according to their assigned IP addresses or their physical addresses, such as, MAC addresses, device identifications, etc. The sensors 130a-130n may be assigned static or dynamic IP addresses as is commonly known in the art. In this instance, the sensors 130a-130n may not be required to transmit their identities since the sensor platform 132a may already have that information stored. For example, the sensor platform 132a may determine which of the sensors 130a-130n transmitted particular data based upon the source IP address of the data. In this regard, the sensor platform 132a may contain, for example, a look up table stored in the memory 256 that correlates the IP addresses of the sensors 130a-130n to their locations in the data center 100. The sensor platform 132a may thus, in certain instances, detect the sensors 130a-130n and determine their locations substantially automatically when the sensors 130a-130n transmit data to the sensor platform 132a. In one regard, therefore, as sensors 130a-130n are added, removed, or replaced, a minimal amount of user intervention is required to track the locations of the sensors 130a-130n.

The sensor platform 132a includes a controller 258 configured to control various operations of the sensor platform 132a. The controller 258 may comprise a microprocessor, a micro-controller, an application specific integrated circuit (ASIC), and the like. In one respect, the controller 258 is configured to receive data transmitted by the sensors 130a-130n, determine which multi-cast address (and port, if applicable) to transmit the data, and to transmit the data to the particular multi-cast address and port, if applicable.

The data transmitted by the sensors 130a-130n to the sensor platform 132a may be received through an input/output module 260 of the controller 258. The data multi-cast by the sensor platforms 130a-130a are also transmitted by the input/output module 260. The input/output module 260 may comprise any reasonably suitable hardware and/or software configured to enable communications between the sensors 130a-130n and the sensor platform 132a and between the sensor platform 132a to multi-cast group addresses in the network 202. In this regard, the input/output module 260 may comprise a network interface and associated software. Thus, although the input/output module 260 has been illustrated as forming part of the controller 258, the input/output module 260 may comprise a separate component without departing from a scope of the sensor platform 132a. In addition, part or all of the input/output module 260 functionalities may be contained in the memory 256.

The memory 256 is configured to store information pertaining to various functionalities of the controller 258. In one regard, the memory 256 may store software or algorithms that the controller 258 may implement in performing various functions. In addition, the memory 256 may store data received from the sensors 130a-130n and may also store software or algorithms that the controller 258 may implement to dynamically switch through a plurality of multi-cast group addresses based on time synchronization, encryption keys, or pseudo-random numbers. The memory 256 may thus be implemented as volatile memory, non-volatile memory, such as DRAM, EEPROM, flash memory, or a combination thereof, and the like. In this regard, the controller 258 may include an address module 262 configured to provide the dynamic switching through multi-cast group addresses. For example, an allocated address band of multi-cast group addresses may be stored in the address module 262, and the address module 252 may implement software or algorithms to randomly select a multi-cast group address from the allocated address band stored based on time synchronization. In another example, the address module 262 may store a look-up table that includes a listing of encryption keys that the address module 262 may use to select a corresponding multi-cast group address within the allocated address band for each encryption key used. In still another example, the address module 262 may store a look-up table that includes a listing of number ranges that the address module 262 may use to select a corresponding multi-cast group addresses within the allocated address band for each pseudo random number generated. Although the address module 262 has been shown in FIG. 2B as forming part of the controller 258, the functionality of the address module 262 may instead form part of the memory 256 without departing from a scope of the system 252. As a further alternative, a network manager 220 (FIG. 2A) may be provided to manage the dynamic switching through multi-cast group addresses for all sensor platforms 132-132n.

The sensor platform 132a may transmit the data received from one or more of the sensors 130a-130n at various times over the network 202 to one or more dynamic multi-cast group addresses. Devices, such as one or more of the clients 212a-212n, a data base client 214, and a controlled device 216, may receive the transmitted data. In addition, interested ones of these devices may act in response to the received data based upon either or both of the source address and the destination address. Those devices that are not interested in the transmitted data may simply drop or discard the received data.

In one example, a client 212a may receive data transmitted by the sensor platform 132a. The client 212a may comprise, for instance, a computing system configured to receive and process the received data. In certain instances, the client 212a may also control one or more components in the data center 100 based upon the data. The client 212a is depicted as including a controller 264 configured to control various operations of the client 212a. The controller 264 may comprise a microprocessor, a micro-controller, an application specific integrated circuit (ASIC), and the like. In one respect, the controller 264 is configured to determine whether the data received from the sensor platform 132a substantially relates to data to which the client 212a is interested. Again, this determination may be made by the controller 264 based upon the multi-cast group address to which the datagram packet was transmitted by the sensor platform 132a.

The data may be received through an input/output module 266 of the controller 264. The input/output module 266 may comprise any reasonably suitable hardware and/or software configured to enable the client 212a to receive and transmit data over the network 202. In this regard, the input/output module 266 may comprise a network interface and associated software. Thus, although the input/output module 266 has been illustrated as forming part of the controller 264, the input/output module 266 may comprise a separate component without departing from a scope of the client 212a. In addition, part or all of the input/output module 266 functionalities may be contained in a memory 268 associated with the client 212a.

In addition to storing data received by the client 212a, the memory 268 is configured to store information pertaining to various functionalities of the controller 264. In one regard, the memory 268 may store software or algorithms that the controller 264 may implement in performing various functions. In another regard, the memory 268 may store software or algorithms that the controller 264 may implement to dynamically switch through a plurality of multi-cast group addresses for receiving data from the sensor platforms 132a-132n based on time synchronization, encryption keys, or pseudo-random numbers so as to synchronize with the switching of such multi-cast group addresses by the sensor platforms 132a-n. The memory 268 may thus be implemented as volatile memory, non-volatile memory, such as DRAM, EEPROM, flash memory, or a combination thereof, and the like.

One of the functions of the controller 264 is to evaluate the received data to determine which actions, if any, are to be performed in response to the received data. In this regard, the controller 264 may include a data evaluation module 270 configured to perform this evaluation. Although the data evaluation module 270 has been shown in FIG. 2B as forming part of the controller 264, the functionality of the data evaluation module 270 may instead form part of the memory 268 without departing from a scope of the system 252.

The data evaluation module 270 may be programmed to, for instance, compare the received data with various instructions that may be stored in the memory 268. By way of example, if the client 212a comprises a control device for a vent tile 118, the data evaluation module 270 may determine whether the vent tile 118 requires manipulation based upon received temperature data. In this instance, the data evaluation module 212a may access information pertaining to when such manipulations are to be performed. In addition, this information may dictate, for example, that the vent tile 118 is to be manipulated to increase cooled airflow supplied therethrough if the received temperature is below a predetermined temperature set point.

If the data evaluation module 270 determines that some type of action is required, this indication may be transmitted to a control module 272 of the controller 264. The control module 272 may comprise hardware or software configured to develop and transmit instructions to one or more controlled devices 216 based upon a determination that some type of action is required. Although the control module 272 has been shown in FIG. 2B as forming part of the controller 264, the functionality of the control module 270 may instead form part of the memory 268 without departing from a scope of the system 252.

In keeping with the example above, the control module 272 may transmit instructions to vary the opening in a vent tile 118 in response to an indication by the data evaluation module 270 that the airflow supplied by the vent tile 118 requires adjustment. The control module 272 may transmit the instructions to a controlled device 216, in this example, a vent tile 118, through the input/output module 266 and over the network 202. In another example, the controlled device 216 may be in direct communication with the client 212a, such as, in situations where the client 212a and the controlled device 216 are integrally fabricated. In this example, the control module 272 may directly transmit control signals to the controlled device 216.

In any regard, the controlled device 216 may also include an input/output module 274 configured to enable the controlled device 216 to receive and transmit data over the network 202. In this regard, the input/output module 274 may comprise any reasonably suitable hardware and/or software configured to enable these communications. The data received, which in certain instances, comprises instructions for the controlled device 216, may be employed to control one or more actuators 276 of the controlled device 216.

The system 252 is also illustrated as including a database client 214 configured to receive and transmit data over the network 202. The database client 214 also includes an input/output module 278, which may comprise any reasonably suitable hardware and/or software configured to enable the data communications. The database client 214 may store the received data in a memory 280, which may comprise volatile memory, non-volatile memory, such as DRAM, EEPROM, flash memory, or a combination thereof, and the like. In addition, the database client 214 may be accessed by other devices, for instance, a client 212a, and the data stored in the memory 280 may be transmitted to the client 212a.

In one example, the database client 214 may aggregate data received from various sensor platforms 132a. In addition, the database client 214 may separate the received data based upon either or both of the source address and destination address associated with the data transmitted by the sensor platform 132a. In this regard, either or both of the source address and the destination address of the datagram packet may be used by the database client 214 to determine how the data is to be stored.

Process

Figure 3:
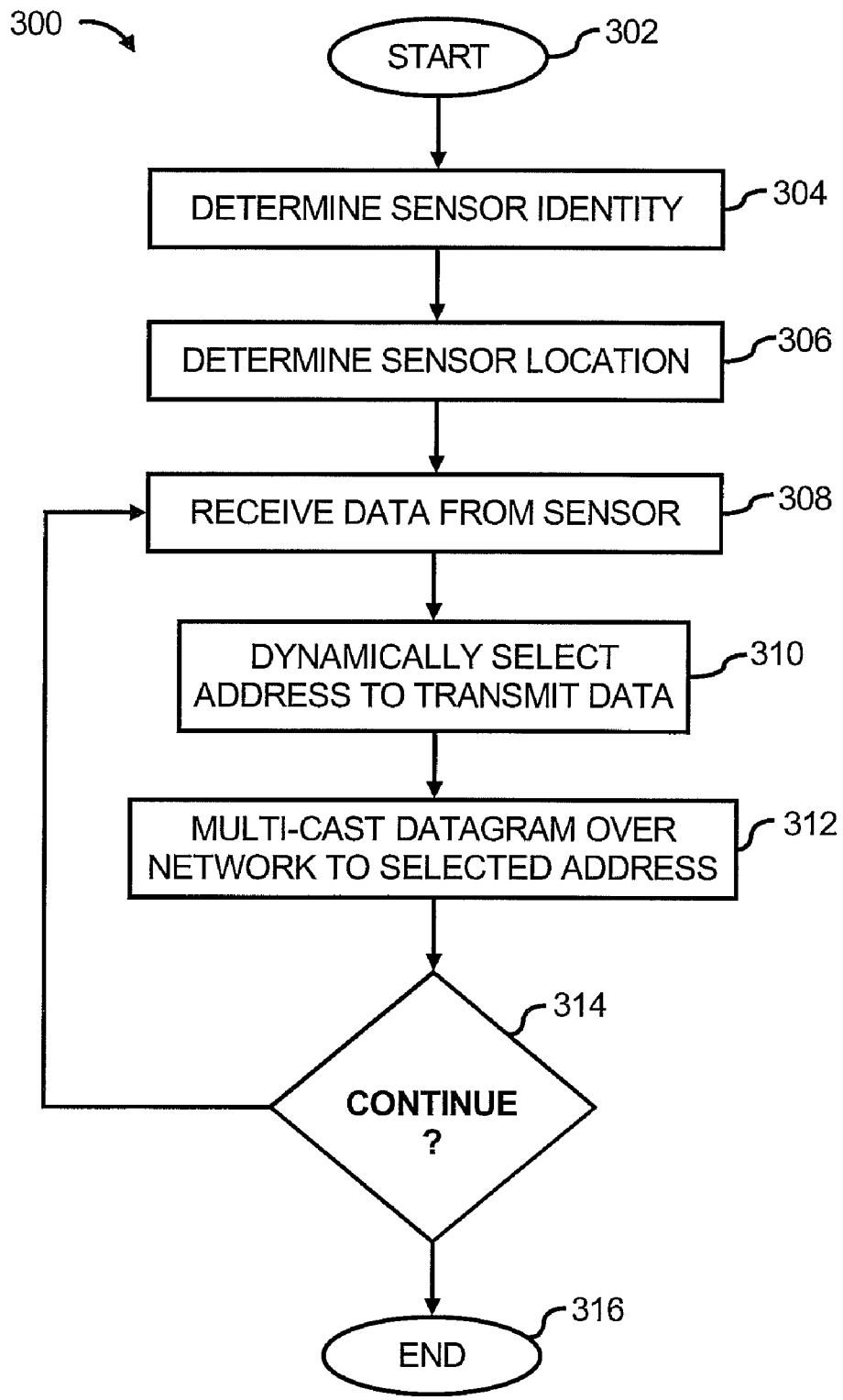
FIG. 3 illustrates a flow diagram of an operational mode for communicating sensed condition data over a network using a sensor platform, according to an embodiment.
Figure 4:
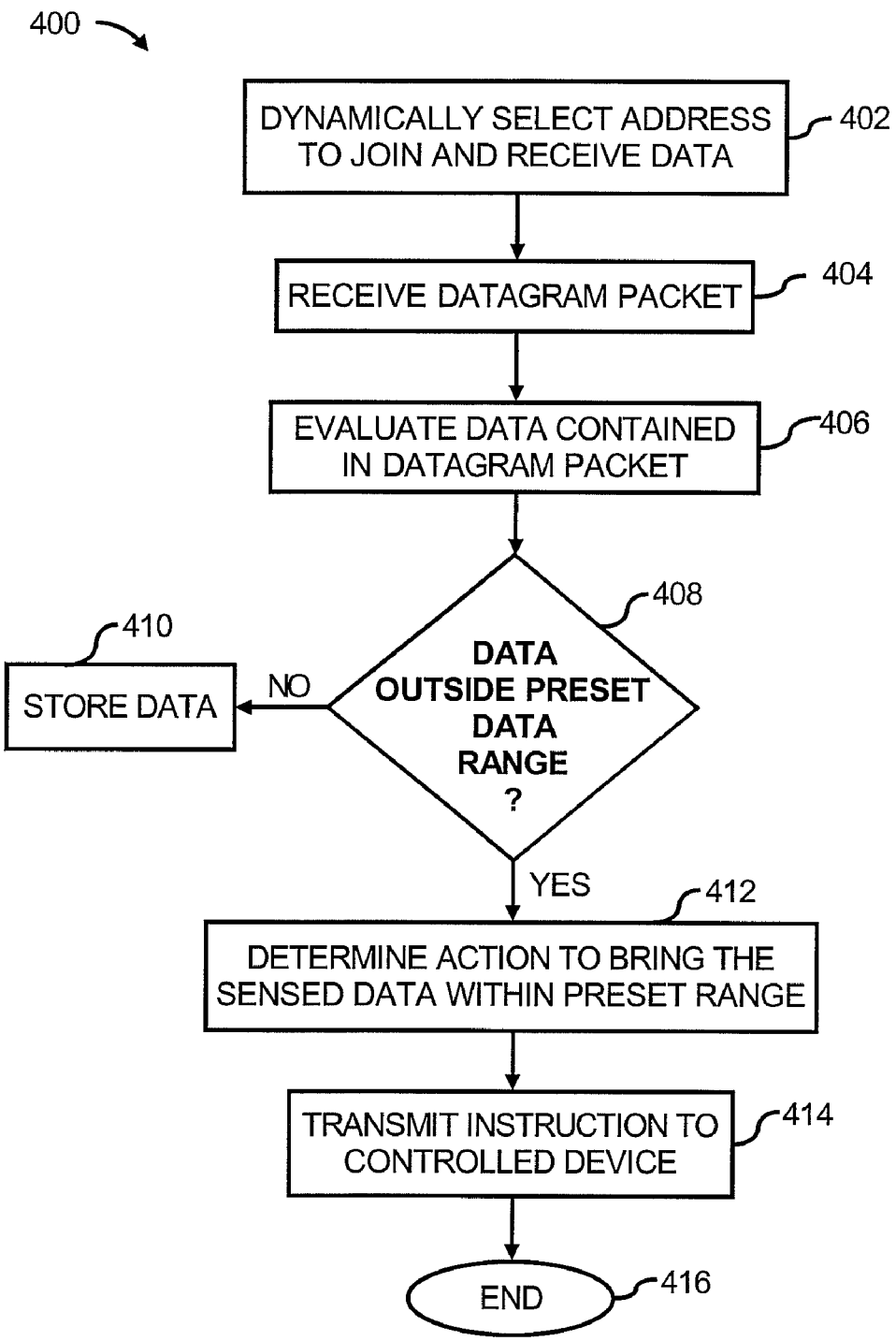
FIG. 4 illustrates a flow diagram of an operational mode for receipt of sensed condition data over a network by a client, according to an embodiment.

FIGS. 3 and 4 illustrate respective flow diagrams depicting respective operational modes for the sensor platforms 132a-132n and the clients 212a-212n according to examples of the invention. However, prior to performance of either operational mode, the same band or range of multi-cast group addresses for data transmission may be allocated for both the sensor platforms 132a-132n and the clients 212a-212n. Consequently, both the sensor platforms 132a-132n and the clients 212a-212n may operate based upon synchronized multi-cast group addresses within the allocated band as further described later.

In addition, because the dynamic multi-cast group addresses define how the information transmitted over the network 202 is utilized, if a sensor platform 132a was removed and replaced with another sensor platform 132b, the another sensor platform 132b would not need to be discovered since that sensor platform 132b would already be configured to be synchronized with the clients 212a-212n to transmit the data to the appropriate synchronized dynamic multi-cast group address(es) and port(s). Likewise, if a client 212a were replaced with another client 212b, the another client 212b would not have to be discovered because the another client 212b would already be programmed to be synchronous with the sensor platforms 132a-132n so that it may receive the data over the network 202 through the synchronized dynamic multi-cast group address(es) and port(s) without requiring that other clients 212c-212n or sensor platforms 132a-132n to know of the client 212a replacement. In this regard, the use of multi-cast group addresses (and ports) as defined herein generally enables "plug and play" network integration for the use of a diverse range of sensor platforms 132a-132n. In addition, the synchronized switching of dynamic multi-cast group addresses (and ports) makes it difficult for a malicious application or party to listen in, a relatively secure sensor network with high availability is also obtainable through use of the network described herein.

With reference first to FIG. 3, there is shown a flow diagram of an operational mode 300 for communicating sensed condition data over a network 202 using a sensor platform 132a. It is to be understood that the following description of the operational mode 300 is but one manner of a variety of different manners in which the sensed condition data may be communicated over a network. It should also be apparent to those of ordinary skill in the art that the operational mode 300 represents a generalized illustration and that other steps may be added or existing steps may be removed or modified without departing from a scope of the operational mode 300. For illustrative purposes only and not to be limiting thereof, the method 300 is discussed in the context of the network diagram 200 illustrated in FIG. 2A and the block diagram 250 illustrated in FIG. 2B.

At step 302, the operational mode 300 may be initiated in response to a variety of stimuli. For example, the operational mode 300 may be initiated in response to a predetermined lapse of time, in response to receipt of a transmitted signal, manually initiated, etc. The operational mode 300 may also be initiated through detection of one or more sensors 130a-130n that may have been connected to the sensor bus 210a. In addition, the operational mode 300 may be initiated through receipt of a signal from the sensor(s) 130a-130n. The signal may include, for instance, the identification of the sensor, a data value (for instance, the detected condition data), a time stamp (for instance, the time at which the data was collected or when the data was transmitted), etc.

Reference is made to a single sensor 130 throughout the description of the operational mode 300 for purposes of simplicity. It should however, be understood that the principles set forth with respect to the sensor 130 are applicable to any number of sensors 130a-130n. In addition, particular reference is also made to a single sensor platform 132a and a single client 212a herein. It should also be understood, however, that additional sensor platforms 132b-132n and clients 212b-212n may also function in manners as described herein with respect to the operational mode 300. Thus, the description of the single sensor platform 132a and the single client 212a in the operational mode 300 is for simplicity of description purposes and may thus be applicable to other sensor platforms 132b-132n and clients 212b-212n.

Steps 304 and 306 may be optional since the sensor platform 132a may already have either determined or been programmed with the sensor 130 identity and location information. However, as indicated at step 304, in the event that the sensor platform 132a receives data from a sensor 130 whose identity is not known to the sensor platform 132a, the sensor platform 132a may determine the identity of the sensor 130. The sensor platform 132a may determine the sensor 130 identity in a substantially automatic manner. In one example, the sensor platform 132a may assign an identity to the sensor 130 based upon the sensor's 130 IP address. The IP address of the sensor 130 may be set dynamically by the sensor platform 132a or it may comprise a static IP address assigned to the location along the sensor bus 210a at which the sensor 130 is located. In another example, the sensor 130 may be assigned a name by, for instance, a user and the name may be stored in the memory 256 of the sensor platform 132a.

As indicated at step 306, the sensor platform 132a may also determine the location of the sensor 130. As described above, the sensor platform 132a may determine the location of the sensor 130 based upon its IP address. In other instances, the sensor platform 132a may receive information pertaining to the location and identification of the sensor 130 and may store this information in the memory 256. In these instances, the sensor 130 may be programmed to transmit its identity and its location along with the detected condition data to the sensor platform 132a. In addition or alternatively, the sensor platform 132a may determine the type of the sensor 130 at step 306.

As an alternative example, the sensor platform 132a may operate to transmit data received from the sensor 130 without prior knowledge of either or both of the sensor 130 identification and the sensor 130 location. In this regard, the sensor platform 132a may be programmed to simply receive data from the sensor 130 and transmit the sensed data over the network 202 to a predefined multi-cast address. The receiving devices, such as, the client 212a, the database client 214, etc., may in this case, be configured to make the sensor 130 identification and location determination based upon, for instance, location and identification data contained in a datagram packet transmitted by the sensor platform 132a.

In any regard, at step 308, the sensor platform 132 may receive the detected condition data from the sensors 130. The received data may include, for instance, the identification of the sensor 130, the detected condition data (or data value), a time stamp (for instance, the time at which the data was collected or when the data was transmitted), a purpose of the data, etc.

At step 310, the sensor platform 132a may dynamically switch through a plurality of multi-cast group addresses (and ports) within the allocated address band, to send the data based at least on time synchronization, encryption keys, or pseudorandom numbers. The synchronization of the dynamic switching of multi-cast group addresses by both the sensor platform 132a-132n and the clients 212a-212n for "listening in" are further described later with reference to FIGS. 5-7. It should be understood that the methods illustrated in FIGS. 5-7 may be extended to include the dynamic switching of multi-cast group ports along with the multi-cast group addresses or in lieu of the multi-cast group addresses.

If the sensor platform 132a, such as the address module 262 therein, is programmed with a number of different predefined sub-bands within the allocated address band from which the sensor platform 132a may select to transmit the datagram packet, the sensor platform 132*a* may select a predefined sub-band based upon, for instance, the sensor 130 from which the data was received at step 308. In this example, the sensor platform 132*a* may select a first predefined sub-band for sensed data received from sensors 130 positioned at a first location, a second predefined sub-band for sensed data received from sensors 130 positioned at a second location, etc. Dynamic selection of a multi-cast group address from within each sub-band may then be performed.

As another example, the sensor platform 132*a* may select the predefined sub-band based upon the type of sensed data transmitted by the sensor 130. Thus, for instance, the sensor platform 132*a* may select a first predefined sub-band for sensed data pertaining to one type of condition, a second predefined sub-band for sensed data pertaining to another type of condition, etc. Dynamic selection of a multi-cast group address from within each sub-band may then be performed.

As a further example, the sensor platform 132*a* may select the predefined multi-cast address based upon a combination of factors. For instance, the sensor platform 132*a* may select a first predefined multi-cast address for sensed data pertaining to a first type of condition and from sensors 130 positioned at a first location, a second predefined multi-cast address for data values pertaining to the first type of condition and from sensors 130 positioned at a second location, etc. In this regard, the sensor platform 132*a* may transmit datagram packets containing data received from a single sensor 130 to various predefined multi-cast addresses.

The various sub-bands of multi-cast group addresses may be set to correspond to differing levels of control in the data center 100. For instance, clients 212*a*-212*n* configured to control devices that affect local areas in the data center 100 may be interested in one of the sub-bands. Other clients 212*a*-212*n* configured to control devices that affect larger or zonal areas in the data center 100 may be interested in another one of the sub-bands. Additional clients 212*a*-212*n* configured to control devices that affect an even larger or global area in the data center 100 may be interested in another one of the sub-bands. Thus, the sub-bands may be defined according to the level of control interested devices have in the data center 100.

Referring back to FIG. 3, at step 312, the sensor platform 132*a* may use the input/output module 260 to transmit data in the form of datagram packets over the network 202 to the dynamically-switched multi-cast group addresses (and ports). At step 314, it may be determined whether the operational mode 300 is to be continued. The operational mode 300 may be continued, for instance, for a predetermined period of time, for a predetermined number of iterations, so long as the sensors 130*a*-130*n* are transmitting data to the sensor platform 132*a*, etc. If it is determined that the operational mode 300 is to continue at step 314, steps 308-314 may be continued for the lengths described above. If, however, it is determined that the operational mode 300 is to be discontinued at step 314 or if the operational mode 300 is manually discontinued, the operational mode 300 may end as indicated at step 316. The end condition at step 316 may be equivalent to a standby state for the operational mode 300 since the operational mode 300 may be re-activated through any of the manners described hereinabove with respect to step 302.

Referring now to FIG. 4, there is shown a flow diagram of an operational mode 400 for receipt of sensed condition data over a network 202 by a client 212*a*. It is to be understood that the following description of the operational mode 400 is but one manner of a variety of different manners in which the sensed condition data may be received over a network 202. It should also be apparent to those of ordinary skill in the art that the operational mode 400 represents a generalized illustration and that other steps may be added or existing steps may be removed or modified without departing from a scope of the operational mode 400. Again, for illustrative purposes only and not to be limiting thereof, the method 300 is discussed in the context of the network diagram 200 illustrated in FIG. 2A and the block diagram 250 illustrated in FIG. 2B.

At step 402, the operational mode 400 may be initiated wherein the client 212*a* is programmed to dynamically switch through a plurality of multi-cast group addresses (and ports) to join and receive data from a sensor platform 132*a*. The client 212*a* is synchronized with the sensor platform 132*a* based on time synchronization, encryption keys, or pseudo-random numbers so that the joined multi-cast group address is the same multi-cast group address the sensor platform 132*a* uses to send out data. The synchronization of the dynamic selection of multi-cast group addresses by the sensor platform 132*a*-132*n* and the dynamic joining of the same multi-cast group addresses by the clients 212*a*-212*n* are further described later with reference to FIGS. 5-7.

At step 404, the client 212*a* uses its input/output module 266 to receive a datagram packet sent to the multi-cast group address.

At step 406, the client 212*a* may evaluate the data contained in the datagram packet for using such data, for example, to control one or more controlled devices 216. Thus, steps 408-414 depict an example of a manner in which the client 212*a* may evaluate and operate a controlled device 216. It should however be understood that steps 408-414 is just one example of any number of possible evaluation and control schemes that the client 212*a* may perform with the data contained in the datagram packet. Therefore, additional control schemes may be implemented by the client 212*a* without departing from a scope of the invention.

At step 408, the client 212*a* may determine whether the data contained in a datagram packet is outside of a preset data range. If the data value is determined as being within the preset data range, the client 212*a* may store this information at step 410 for later use or as a basis for future comparisons, and the operational mode 400 may end as indicated at step 420. If, however, the data is outside of the preset data value range, the client 212*a* may determine an action designed to bring the data value within the preset data range as indicated at step 412. In addition, at step 414, the client 212*a* may transmit an instruction (using its input/output module 266) to a controlled device 216 to perform the action determined at step 412. Following step 414, the operational mode 400 may end as indicated at step 416.

Steps 408-414 will now be described in terms of an example related to the supply of cooled airflow to a rack 102*a*. In this example, the data may comprise temperature and the preset data range may comprise a range of desired temperatures for airflow supplied into the rack 102*a*. The desired temperature range may thus include minimum and maximum temperature set points. If it is determined that the detected temperature is outside of the range of desired temperatures, the client 212*a* may determine whether the detected temperature is above the maximum temperature set point or whether it is below the minimum temperature set point to determine an action to bring the temperature within the preset range at step 412. If it is determined that the detected temperature is above the maximum temperature set point, the client 212*a* may determine that the temperature of the airflow supplied by a CRAC unit 114 should be reduced or that the rate of airflow supplied through one or more vent tiles 118 should be increased. Alternatively, if it is determined that the detected temperature is below the minimum temperature set point, the client 212a may determine that the temperature of the airflow supplied by a CRAC unit 114 should be increased or that the rate of the airflow supplied through one or more vent tiles 118 should be decreased. At step 414, once the corrective action is determined at step 416, the client 212a may transmit an instruction to the CRAC unit 114 or vent tile 118 such that one or more actuators associated with these devices may be manipulated to thus perform the determined action.

Figure 5:
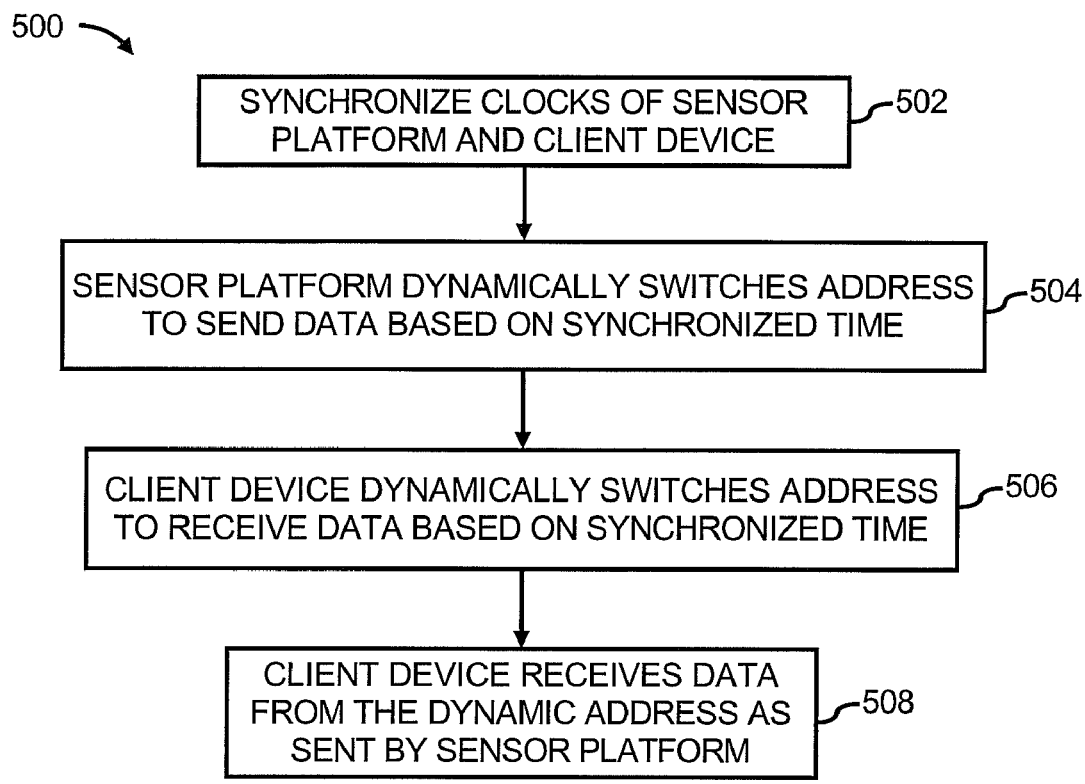
FIG. 5 illustrates a method for dynamically switching through a plurality of multi-cast group addresses for data communication, according to one embodiment.
Figure 6:
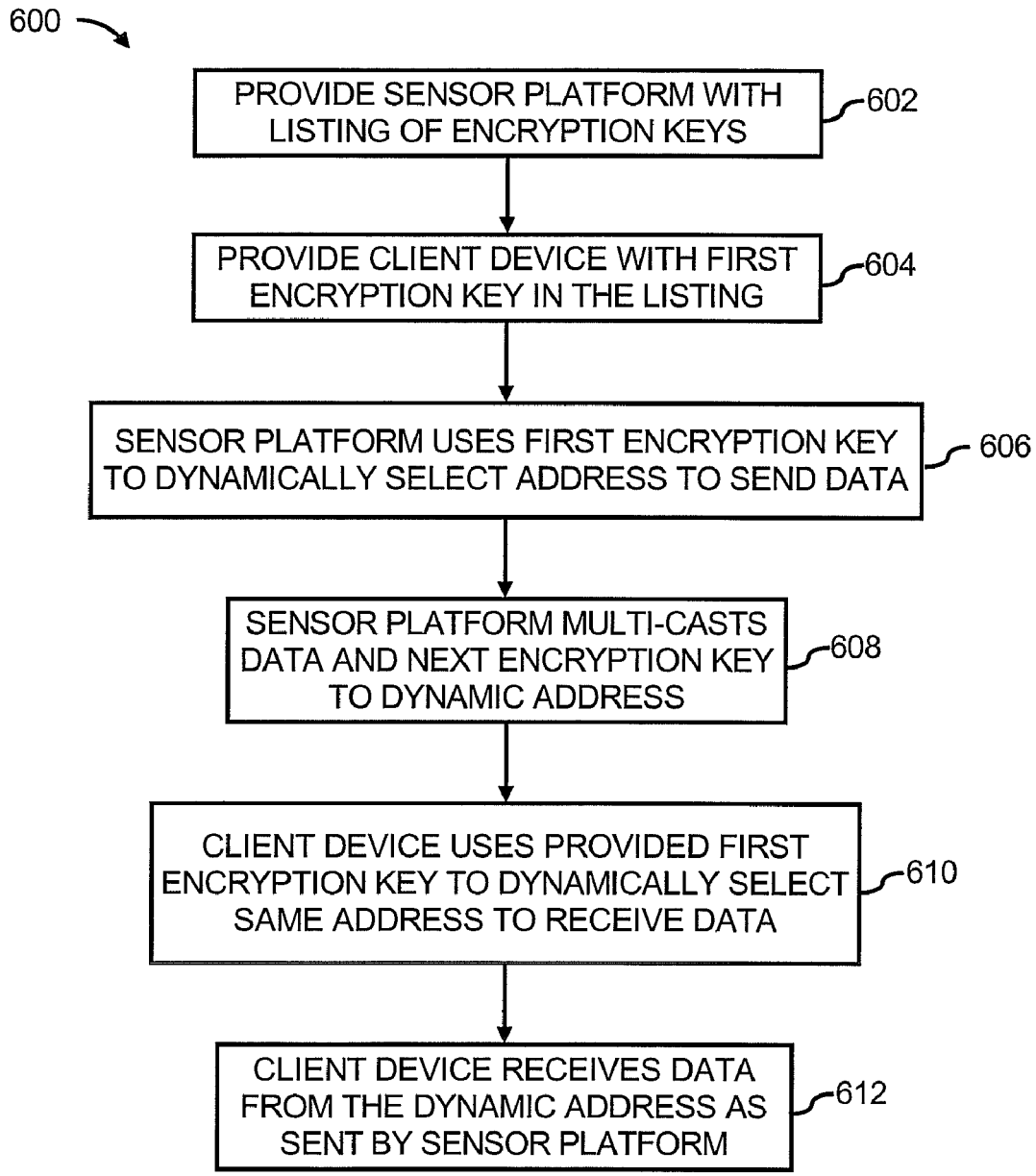
FIG. 6 illustrates another method for dynamically switching through a plurality of multi-cast group addresses for data communication, according to one embodiment.
Figure 7:
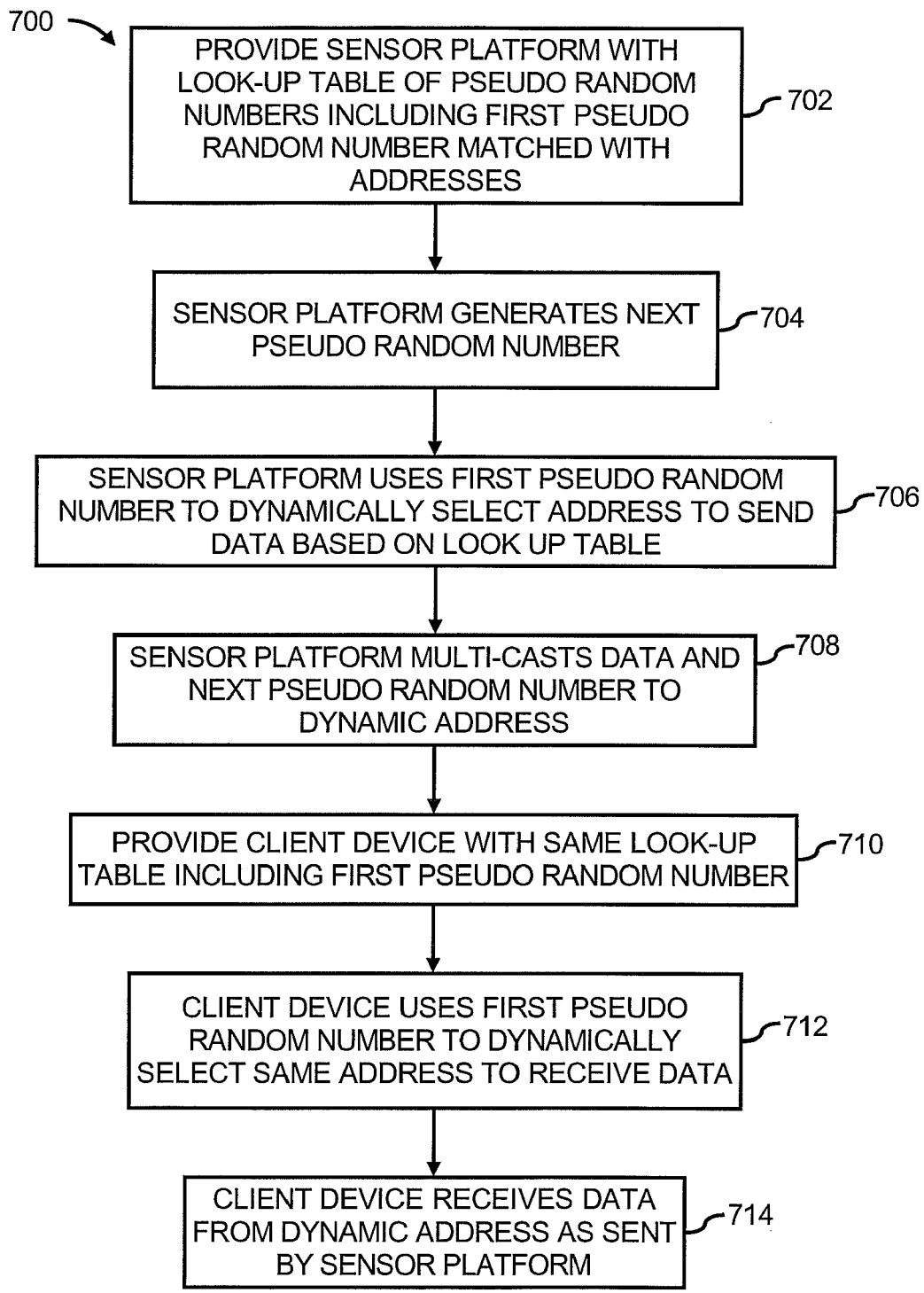
FIG. 7 illustrates still another method for dynamically switching through a plurality of multi-cast group addresses for data communication, according to one embodiment.

FIGS. 5-7 describe several methods for synchronizing the dynamic selection of multi-cast group addresses (and ports) by data senders, such as the sensor platform 132a-132n, and the dynamic joining of the same multi-cast group addresses by the data "listeners," such as the clients 212a-212n. Again, for illustrative purposes only and not to be limiting thereof, these several methods are discussed in the context of the network diagram 200 illustrated in FIG. 2A and the block diagram 250 illustrated in FIG. 2B. Also, for simplicity of description purposes, the methods in FIGS. 5-7 are described with reference to a single sensor platform 130a and a single client 212a. However, it should be understood that additional sensors 132b-132n and clients 212b-212n may also function in manners as described herein with respect to the methods in FIGS. 5-7. It also should be understood that the several methods shown in FIGS. 5-7 may be extended to include dynamic selection and joining of multi-cast group ports in addition to or in lieu of the dynamic selection and joining of multi-cast group addresses.

FIG. 5 illustrates a first method 500 of time synchronization of the sensor platform 132a and the client 212a for dynamically switching through a plurality of multi-cast group addresses for data communication.

At 502, clocks of the sensor platform 132a and the client 212a are synchronized so that they provide the same time measurements to both. For example, the sensor platform 132a may include a clock operating in the address module 262, or in any other suitable part of the sensor platform 132a. Such a clock may be used exclusively for the dynamic switching of multi-cast group addresses or generally for one or more other functions by the sensor platform 132a as well. Likewise, the client 212a may include a clock operation in its controller 264, its control module 272, or in any other suitable part of the client 212a. The clocks in the sensor platform 132a and the client 212a may be synchronized through a simultaneous reset of both clocks. Alternatively, reference clock signals from an external clock may be fed to both the sensor platform 132a and the client 212a to ensure that both are synchronized with respect to time.

At 504, once the clocks on the sensor platform 132a and the client 212a are synchronized, the sensor platform 132a proceeds to dynamically switch through a plurality of multi-cast group addresses that may be used to send data to the client 212a. Thus, step 504 corresponds to step 310 shown in FIG. 3. The dynamic switching of the multi-cast group addresses may be performed by the address module 262 of the sensor platform 132a as follows. Periodically at a constant time interval (e.g., every 5 minutes) or at any desired time interval, the address module 262 first determines a current time from the clock of the sensor platform 132a. Then, it executes any known algorithm for randomly selecting a multi-cast group address from a range of addresses based on the determined current time. For example, any pseudo-random number generator algorithm may be used, wherein the random sequence is relatively uncorrelated and its probability may be based on a choice of distribution such as Gaussian, exponential, etc. In another example, acceptance-rejection algorithm also may be used for the creation of random numbers with arbitrary distribution. In this case, the range of addresses used is the allocated band (or sub-band) of multi-cast addresses stored in the address module 262 as described earlier. Alternatively, the dynamic switching of addresses may be based on a look-up table maintained in the address module 262 or any other suitable location in the sensor platform 132a. The look-up table maintains a list of predefined multi-cast group addresses, each may be used at a specified time interval, as determined from the clock of the sensor platform 132a.

At 506, once the clocks on the sensor platform 132a and the client 212a are synchronized, the client 212a also proceeds to dynamically switch through the same multi-cast group addresses used by the sensor platform 132a to join in order to receive data from the sensor platform 132a. Thus, step 506 corresponds to step 402 shown in FIG. 4. The dynamic switching of the multi-cast group addresses to join may be performed by the controller 264 of the client 212a based on the synchronized current time and the same random-selection algorithm used by the sensor platform 132a. Thus, address hopping is employed to provide different multi-cast group addresses at different times to prevent malicious interception of sensor data transmitted from the sensor platform 132a to the client 212a. Because the clocks of the sensor platform 132a and the client 212a are synchronized to provide the same value at any instance, and the random-selection algorithm used by the sensor platform 132a and the client 212a are the same, the same multi-cast group addresses are selected for switching by both the sensor platform 132a and the client 212a for data transmission between these two devices.

At 508, once the client 212a registers with the network 202 to join the dynamically-selected multi-cast group address, the client 212a is operable to listen in to, i.e., receive, data transmitted by the sensor platform 132a to such a multi-cast group address. Thus, step 508 corresponds to step 404 shown in FIG. 4.

FIG. 6 illustrates a second method 600 that uses synchronous encryption keys in the sensor platform 132a and the client 212a to dynamically switch through a plurality of multi-cast group addresses for data communication.

At 602, the sensor platform 132a has stored or provided therein a listing of encryption keys that may be used to dynamically select a multi-cast group address that, in turn, may be used to transmit data to the client 212a. As noted earlier, such a listing may be stored as a file in the address module 262 of the sensor platform 132a. Alternatively, the listing may be stored as a file in any other suitable location in the sensor platform 132a. The listing includes a first encryption key to be used to dynamically select an initial multi-cast group address for transmitting data. Alternatively, the sensor platform 132a may be provided with the initial multi-cast group address.

At 604, the client 212a is initially provided with the same first encryption key in the look-up table maintained by the sensor platform 132a. Alternatively, the client 212a is provided with the initial multi-cast group address.

At 606, the sensor platform 132a uses the first encryption key to dynamically select the initial multi-cast group address to transmit data to the client 212a. Thus, step 606 corresponds to step 310 shown in FIG. 310. The dynamic selection of a multi-cast group address may be performed by the address module 262 of the sensor platform 132a using any known encryption/decryption algorithm that is capable of decrypting an encryption key in order to dynamically select a corresponding multi-cast group address from a range of addresses. For example, both asymmetric and symmetric encryption algorithms may be used with different encryption standards like advanced encryption standard (AES), data encryption standard (DES), or Triple DES. In this case, the range of addresses used is the allocated band (or sub-band) of multi-cast addresses stored in the address module 262 as described earlier. Alternatively, if already provided, the sensor platform 132a may select the provided initial multi-cast group address.

At 608, the sensor platform 132a multi-casts a datagram packet over the network to the dynamic multi-cast group addresses, beginning with the initial multi-cast group address. Thus, step 608 corresponds to step 312 shown in FIG. 3. At step 608, the sensor platform 132a also transmits a next encryption key to the client 212a, through the initial multi-cast group address, so that encryption keys used by both the sensor platform 132a and the client 212a are always synchronized to be the same to enable the dynamic switching to the same multi-cast group address by both the sensor platform 132a and the client 212a at any instance.

At 610, the client 212a also uses the first encryption key initially provided or stored therein to dynamically select the same initial multi-cast group address to join in order to receive data from the sensor platform 132a. Alternatively, if already provided, the client 212a selects the same initial multi-cast group address. Thus, step 608 corresponds to step 402 shown in FIG. 4. This dynamic selection may be performed by the controller 264 of the client 212a using the same encryption/decryption algorithm used by the sensor platform 132a to decrypt the same first encryption key.

At 612, once the client 212a registers with the network 202 to join a dynamically-selected multi-cast group address, the client 212a is operable to listen in to, i.e., receive, data transmitted by the sensor platform 132a to such an address. Thus, step 714 corresponds to step 404 shown in FIG. 4.

The method or process 600 is repeated for each new encryption key used subsequent to the second encryption key, used by the sensor platform 132a, which may retrieve or look up each new encryption key in the aforementioned list for use at any desired instance, and the new encryption key is provided to the client 212a for use to select the next multi-cast group address to hop or switch to for data transmission. Accordingly, synchronized encryption keys are available to both the sensor platform 132a and the client 212a to enable synchronized switching of multi-cast group addresses by both devices for security purposes.

FIG. 7 illustrates a third method 700 that uses synchronous pseudorandom numbers in the sensor platform 132a and the client 212a to dynamically switch through a plurality of multi-cast group addresses for data communication.

At 702, the sensor platform 132a has stored or provided therein a look-up table matching each particular pseudorandom number or a range of pseudorandom numbers with a different predefined multi-cast group address to be used to transmit data. The look-up table may be stored as a file in the address module 262 or any other suitable location in the sensor platform 132a. The look-up table includes a first pseudorandom number generated or chosen to be used to dynamically select an initial multi-cast group address for transmitting data. Alternatively, the sensor platform 132a may store the initial multi-cast group address.

At 704, the sensor platform 132a includes a pseudorandom number generator (PRNG) that may be used to generate a second pseudorandom number. The PRNG may be implemented as software or algorithms in the address module 262, in the memory 256, or in any other suitable location within the sensor platform 132a. The address module 262 may execute the PRNG to generate or produce pseudorandom numbers that may be used to dynamically switch through a plurality of multi-cast group addresses for data transmission to the client 212a.

At 706, the sensor platform 132a uses the first pseudorandom number to dynamically select an initial multi-cast group address to transmit data to the client 212a. Thus, step 706 corresponds to step 310 shown in FIG. 310. The dynamic selection of a multi-cast group address may be performed by the address module 262 of the sensor platform 132a using the look-up table to match the pseudorandom number with a corresponding multi-cast group address. Alternatively, if already provided, the sensor platform 132a may select the provided initial multi-cast group address.

At 708, the sensor platform 132a multi-casts a datagram packet over the network to the dynamic multi-cast group addresses, beginning with the initial multi-cast group address. Thus, step 708 corresponds to step 312 shown in FIG. 3. At step 708, the sensor platform 132a also transmits the next (i.e., second) pseudorandom number generated at 704 to the client 212a, so that the pseudorandom numbers used by both the sensor platform 132a and the client 212a are always synchronized to be the same to enable the dynamic switching to the same multi-cast group address by both the sensor platform 132a and the client 212a at any instance.

At 710, the client 212a also has stored or provided therein the same look-up table of pseudorandom numbers and predefined multi-cast group addresses. The client 212a also has stored therein the first pseudorandom number, or alternatively, the same initial multi-cast group address stored in the sensor platform 132a.

At 712, the client 212a also uses the first pseudorandom number initially provided or stored therein to dynamically select the same initial multi-cast group address to join in order to receive data from the sensor platform 132a. Alternatively, if already provided, the client 212a may dynamically select the same initial multi-cast group address. Thus, step 710 corresponds to step 402 shown in FIG. 4. This dynamic selection may be performed by the controller 264 of the client 212a.

At 714, once the client 212a registers with the network 202 to join a dynamically-selected multi-cast group address, the client 212a is operable to listen in to, i.e., receive, data transmitted by the sensor platform 132a to such an address. Thus, step 714 corresponds to step 404 shown in FIG. 4.

The method or process 700 is repeated for each new pseudorandom number generated subsequent to the second pseudorandom number, at any desired instance. That is, each newly generated pseudorandom number is used by both the sensor platform 132a and the client 212a to dynamically select the next multi-cast group address to hop or switch to for data transmission. Accordingly, synchronized pseudorandom numbers are available to both the sensor platform 132a and the client 212 to ensure synchronized switching of the multi-cast group addresses by both devices for security purposes.

The operations illustrated in the operational modes 300 and 400 and the methods 500, 600, and 700 may be contained as a utility, program, or a subprogram, in any desired computer accessible medium. In addition, the operational modes 300 and 400 and methods 500, 600, and 700 may be embodied by a computer program, which can exist in a variety of forms both active and inactive. For example, they can exist as software program(s) comprised of program instructions in source code, object code, executable code or other formats. Any of the above can be embodied on a computer readable medium, which include storage devices and signals, in compressed or uncompressed form.

Exemplary computer readable storage devices include conventional computer system RAM, ROM, EPROM, EEPROM, and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that any electronic device capable of executing the above-described functions may perform those functions enumerated above.

Figure 8:
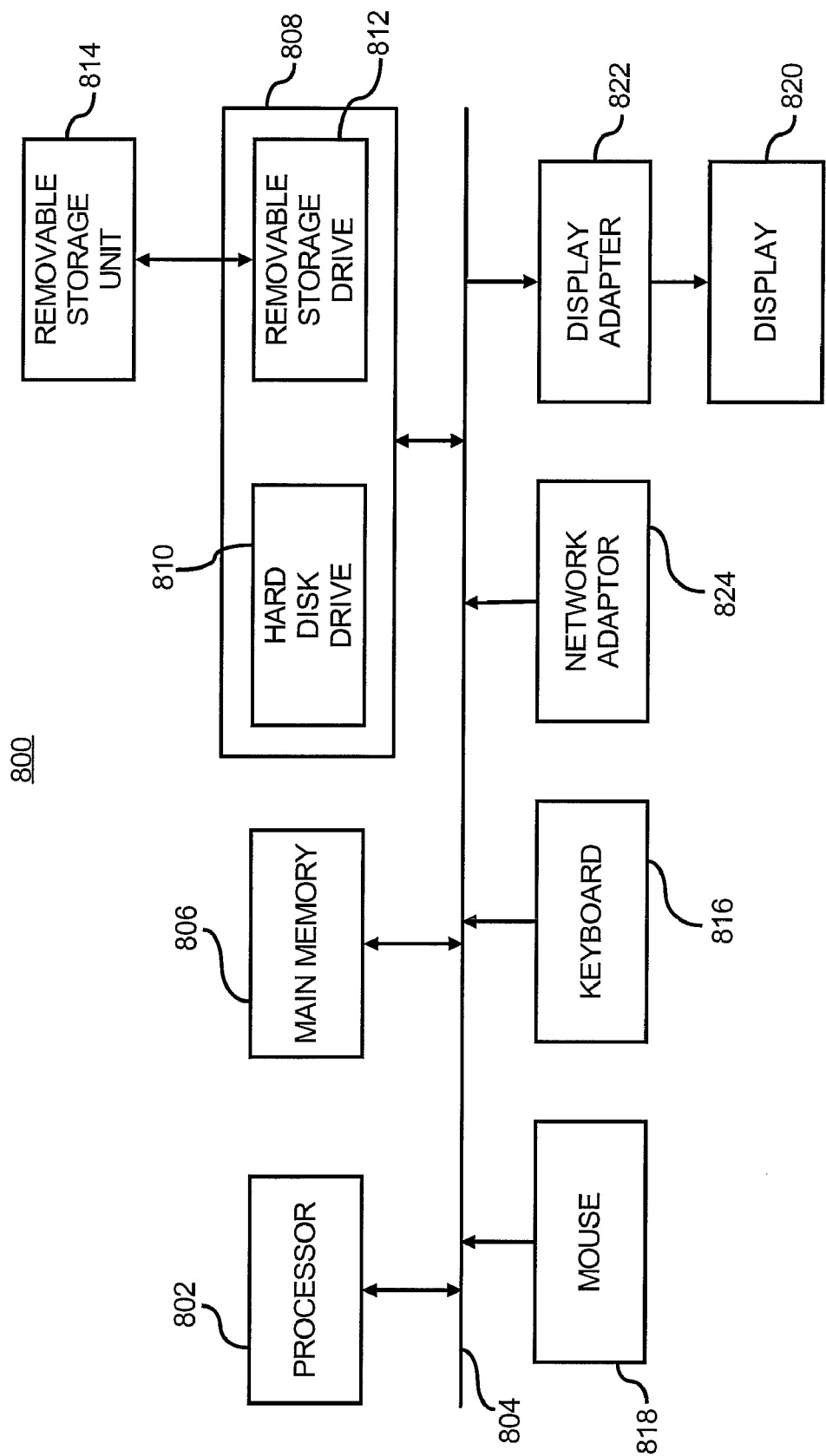
FIG. 8 illustrates a computer system which may be employed to perform various functions described herein, according to an embodiment.

FIG. 8 illustrates a computer system 800, which may be employed to perform various functions described herein. The computer system 800 may include, for example, the computing device 128, the controllers 258 of the sensor platforms 132a-132n, and/or the controllers 264 of the clients 212a-212n. In this respect, the computer system 800 may be used as a platform for executing one or more of the functions described herein above with respect to the various components of the sensor platforms 132a-132n and clients 212a-212n.

The computer system 800 includes one or more controllers, such as a processor 802. The processor 802 may be used to execute some or all of the steps described in the operational modes 300 and 400. Commands and data from the processor 802 are communicated over a communication bus 804. The computer system 800 also includes a main memory 806, such as a random access memory (RAM), where the program code for, for instance, the computing device 128 or the controller 258, may be executed during runtime, and a secondary memory 808. The secondary memory 808 includes, for example, one or more hard disk drives 810 and/or a removable storage drive 812, representing a floppy diskette drive, a magnetic tape drive, a compact disk drive, etc., where a copy of the program code for the sensor platforms 132a-132n may be stored.

The removable storage drive 810 reads from and/or writes to a removable storage unit 814 in a well-known manner. User input and output devices may include a keyboard 816, a mouse 818, and a display 820. A display adaptor 822 may interface with the communication bus 804 and the display 820 and may receive display data from the processor 802 and convert the display data into display commands for the display 820. In addition, the processor 802 may communicate over a network, for instance, the Internet, LAN, etc., through a network adaptor 824.

It will be apparent to one of ordinary skill in the art that other known electronic components may be added or substituted in the computer system 800. In addition, the computer system 800 may include a system board or blade used in a rack in a data center, a conventional "white box" server or computing device, etc. Also, one or more of the components in FIG. 8 may be optional (for instance, user input devices, secondary memory, etc.).

What has been described and illustrated herein is an embodiment along with some of its variations. The terms, descriptions and figures used herein are set forth by way of illustration only and are not meant as limitations. Those skilled in the art will recognize that many variations are possible within the spirit and scope of the subject matter, which is intended to be defined by the following claims—and their equivalents—in which all terms are meant in their broadest reasonable sense unless otherwise indicated.

What is claimed is:

1. A method for securely communicating sensed data over a network, said method comprising:
   receiving sensed data from a sensor;
   periodically and dynamically selecting a subset of a plurality of multi-cast group addresses by a processor utilizing one of a plurality of encryption keys to perform the selecting, such that different groups of multi-cast group addresses are selected at different periods of time, and wherein the plurality of multi-cast group addresses are destinations for sending the received sensed data to client devices;
   dynamically selecting a first multi-cast group of addresses from the plurality of multi-cast group addresses based on a first encryption key of the plurality of encryption keys, the client devices dynamically joining the first multi-cast group of addresses based on a provided first encryption key and receiving the sensed data from the first multi-cast group of addresses;
   dynamically selecting a second multi-cast group of addresses from the plurality of multi-cast group addresses based on a second encryption key of the plurality of encryption keys, the client devices dynamically joining the second multi-cast group of addresses based on a provided second encryption key and receiving the sensed data from the second multi-cast group address; and
   transmitting the sensed data to the selected subset of the plurality of multi-cast group addresses for receipt by the client devices.

2. The method of claim 1, wherein receiving the sensed data comprises receiving the sensed data in a sensor platform and wherein transmitting the sensed data comprises employing the sensor platform to transmit the sensed data, wherein the sensor platform is programmed to dynamically select the subset of the plurality of multi-cast group addresses.

3. The method of claim 1, wherein periodically and dynamically selecting the subset of the plurality of multi-cast group addresses further comprises:
   assigning the selected subset of the plurality of multi-cast group addresses to a packet containing the sensed data.

4. The method of claim 1, wherein selecting the subset of the plurality of multi-cast group addresses comprises:
   randomly selecting a first multi-cast group of addresses from the plurality of multi-cast group addresses based on a random-selection algorithm.

5. The method of claim 4, further comprising:
   the client devices dynamically joining the first multi-cast group of addresses based on the random-selection algorithm; and
   the client devices receiving the sensed data from the first multi-cast group of addresses.

6. The method of claim 5, further comprising:
   dynamically selecting a second multi-cast group of addresses from the plurality of multi-cast group addresses based on the random-selection algorithm.

7. The method of claim 6, further comprising:
   the client devices dynamically joining the second multi-cast group of addresses based on the random-selection algorithm; and
   the client devices continuing to receive the sensed data from the second multi-cast group of addresses.

8. The method of claim 1, the method further comprising:
   storing the plurality of encryption keys.

9. The method of claim 1, further comprising:
   providing the client devices with the first encryption key.

10. The method of claim 9, further comprising:
    providing the client devices with the second encryption key;
    and the client devices continuing to receive the sensed data from the second multi-cast group address.

11. The method of claim 1, the method further comprising: generating a plurality of pseudorandom numbers, and wherein selecting the subset of the plurality of multi-cast group addresses comprises utilizing one of the pseudorandom numbers to perform the selecting.

12. The method of claim 11, wherein periodically and dynamically selecting the subset of the plurality of multi-cast group addresses further comprises:
dynamically selecting a first multi-cast group of addresses from the plurality of multi-cast group addresses based on a first pseudorandom number of the plurality of pseudorandom numbers.

13. The method of claim 12, further comprising:
providing the client devices with the first pseudorandom number;
the client devices dynamically joining the first multi-cast group of addresses based on the provided first pseudorandom number; and
the client devices receiving the sensed data from the first multi-cast group of addresses.

14. The method of claim 13, further comprising:
dynamically selecting a second multi-cast group of addresses from the plurality of multi-cast group addresses based on a second pseudorandom number of the plurality of pseudorandom numbers;
providing the client devices with the second pseudorandom number;
the client devices dynamically joining the second multi-cast group of addresses based on the provided second pseudorandom number; and
the client devices continuing to receive the sensed data from the second multi-cast group of addresses.

15. A sensor platform comprising:
an input module to receive sensed data from at least one sensor;
an address module to periodically and dynamically select a subset of a plurality of multi-cast group addresses and ports as destinations to send the received sensed data to client devices, such that different groups of multi-cast group addresses are selected at different periods of time, wherein to periodically and dynamically select the subset of the plurality of multi-cast group addresses comprises to utilize one of a plurality of pseudorandom numbers to perform the selecting;
a first multi-cast group of addresses dynamically selected from the plurality of multi-cast group addresses based on a first pseudorandom number of the plurality of pseudorandom numbers, the client devices to dynamically join the first multi-cast group of addresses based on a provided first pseudorandom number and to receive the sensed data from the first multi-cast group of addresses;
a second multi-cast group of addresses dynamically selected from the plurality of multi-cast group addresses based on a second pseudorandom number of the plurality of pseudorandom numbers, the client devices to dynamically join the second multi-cast group of addresses based on a provided second pseudorandom number and to receive the sensed data from the second multi-cast group address; and
an output module to transmit the sensed data to the selected subset of the plurality of multi-cast group addresses and the selected subset of the plurality of multi-cast group ports for receipt by the client devices.

16. The sensor platform of claim 15, wherein the plurality of multi-cast group addresses are selected from an allocated band of multi-cast group addresses based on one of a location of the at least one sensor and a type of the sensed data prior to the dynamic selecting the subset of the plurality of multi-cast group addresses.

17. The sensor platform of claim 15, wherein the address module is to assign the selected subset of the plurality of multi-cast group addresses to a packet containing the sensed data.

18. The sensor platform of claim 15, wherein the address module includes a pseudorandom generator to generate the plurality of pseudorandom numbers, and wherein, at each periodic switch, the address module utilizes one of the pseudorandom numbers to select a subset of the plurality of multi-cast group addresses.

19. A non-transitory computer readable medium on which is embedded programming code that is executed by a computer processor to:
receive sensed data from a sensor;
periodically and dynamically select a subset of a plurality of multi-cast group addresses as destinations to send the received sensed data to client devices utilizing one of a plurality of encryption keys to perform the selecting, such that different groups of multi-cast group addresses are selected at different periods of time;
dynamically select a first multi-cast group of addresses from the plurality of multi-cast group addresses based on a first encryption key of the plurality of encryption keys, the client devices to dynamically join the first multi-cast group of addresses based on a provided first encryption key and to receive the sensed data from the first multi-cast group of addresses;
dynamically select a second multi-cast group of addresses from the plurality of multi-cast group addresses based on a second encryption key of the plurality of encryption keys, the client devices to dynamically join the second multi-cast group of addresses based on a provided second encryption key and to receive the sensed data from the second multi-cast group address; and
transmit the sensed data to the selected subset of the plurality of multi-cast group addresses for receipt by the client devices.

* * * * *